Patented Sept. 6, 1932

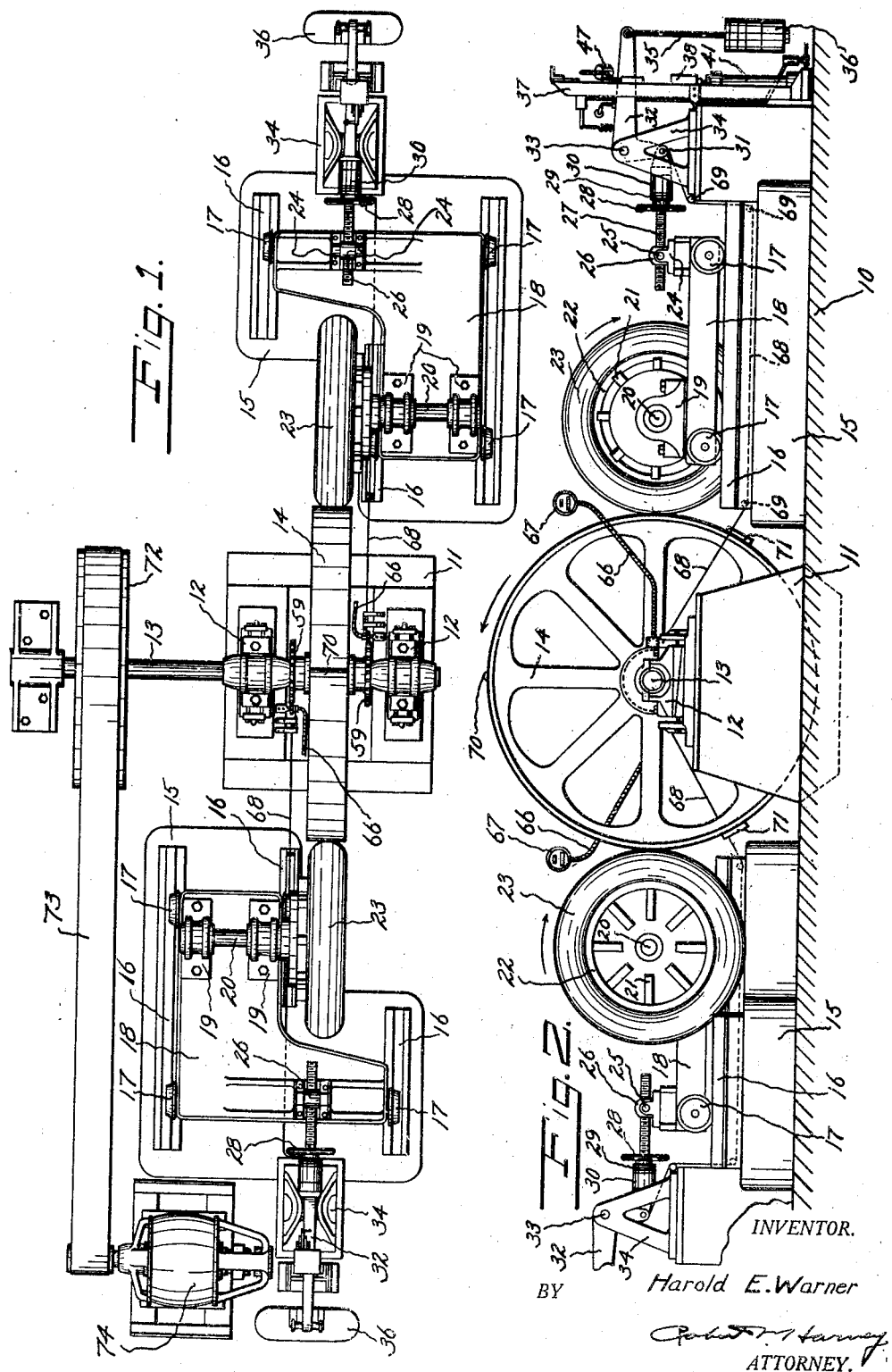

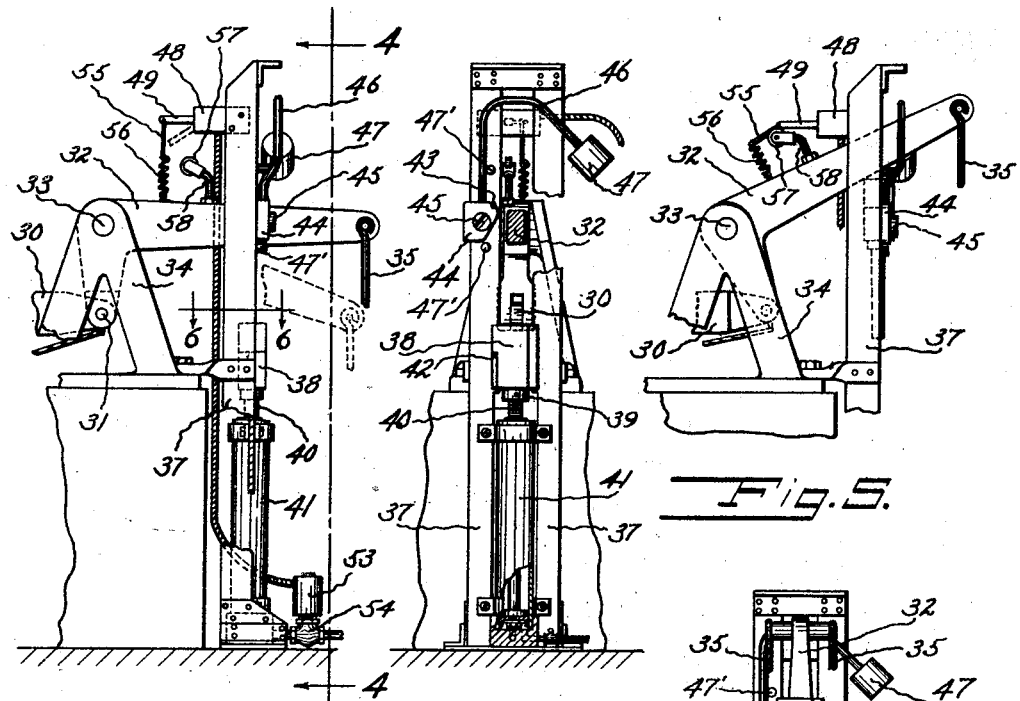

1,875,786

UNITED STATES PATENT OFFICE

HAROLD E. WARNER, OF WEST SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

TIRE TESTING MACHINE

Application filed February 18, 1928. Serial No. 255,225.

My invention relates to machines for testing pneumatic tire casings of the type in which the tire is pressed against a rotating drum. The object of the invention is to preserve the tire from further injury after it has failed, and to preserve an accurate record of the amount the tire has run prior to failure.

Referring to the drawings,

Fig. 1 is a top plan view of a tire testing machine embodying my invention;

Fig. 2 is a side elevation thereof;

Fig. 3 is an enlarged fragmentary side elevation;

Fig. 4 is a section on line 4—4 of Fig. 3;

Fig. 5 is a detail corresponding to a portion of Fig. 3, but showing the parts in a different position of operation;

Fig. 6 is a section on line 6—6 of Fig. 3;

Fig. 7 is an end elevation of Fig. 5;

Figs. 8 and 9 are respectively top and side views on a larger scale of parts shown in Figs. 1 and 2; and Fig. 10 is a wiring diagram.

The mechanisms are mounted on a base or foundation 10, preferably of concrete. From this base rises a frame 11 carrying journals 12 for a cross shaft 13. A large wheel 14 fixed to this shaft has a flat outer periphery serving as the artificial road surface against which the tires are run. A pair of frames 15, located on the base at opposite sides of the large wheel, bear tracks 16 upon which run the wheels 17 of carriages 18. These carriages are duplicates, and a description of one will suffice for both.

Each carriage bears a pair of journals 19 supporting a shaft 20. A chuck 21 at one end of the shaft is fitted to receive the usual rim 22 of the tire 23 to be tested. At the rear of the carriage are brackets 24 bearing the pivots 25 of a block 26 into which is threaded a screw 27. The screw bears a hand wheel 28, and is suitably mounted for rotation without endwise movement by thrust collars 29 in a block 30 pivoted at 31 to the short arm of a bell crank 32. The long arm of the bell crank extends substantially horizontally, the crank being pivoted at 33 to a frame 34. Rods 35 at the end of the long arm carry a weight 36 which constantly urges the carriage 18 towards the large wheel 14.

At the end of frame 34 rise a pair of spaced angle irons 37 forming ways for a slotted slide 38 (see Figs. 4 and 6). The slide is secured as at 39 to a piston rod 40 attached to a piston running in a hydraulic cylinder 41. A shoulder 42 is formed on the slide which mates with a shoulder 43 on a latch block 44 pivoted at 45 to one of the angle irons 37. A rod 46 extends from the block and bears a weight 47 constantly urging the block in a clockwise direction as viewed in Figs. 3 and 7, so that it is in position to engage the slide 38 and retain it in elevated position. Stop pins 47' are preferably provided to limit the motion of the block in each direction.

Attached to one of the angle irons 37 is a switch box 48 in which is pivoted a bell crank control arm 49 having a spring 50 (Fig. 10) attached to it so as to pass substantially through the pivot point and hold the arm in either extreme position by the usual toggle action. When in one position the arm strikes against a stop 51, and in the other bears against a contact point 52. An electrical circuit is thus completed as shown in Fig. 10 through the pivot, control arm 49, contact point 52, and the solenoid 53 of an electrically operated valve 54 controlling the admission of water under pressure to the hydraulic cylinder 41. A link 55 attached to the control arm 49 is joined, preferably through a spring 56, with the long arm of the bell crank 32 so that when the latter is swung into the dotted line position of Fig. 3 the switch will be closed and the valve 54 caused to open. To reset the switch a roll 57 is mounted on a bracket 58 upon the bell crank 32, and as shown in Fig. 5 moves the control arm 49 upwardly when the bell crank is raised to its upper position.

Considering the operation of this much of the apparatus it is apparent that upon the failure of a tire under test the shaft 20 will at once be forced towards the wheel 14 by the force of weight 36. This causes the horizontal arm of the bell crank 32 to drop, which closes the switch in box 48 and by passing current through solenoid 53 opens the water valve 54. The water pressure thus introduced within the hydraulic cylinder 41 raises the slide 38 which bears under the long arm of the bell crank and raises it. Near the upper limit of its motion the shoulder 42 on slide 38 passes the shoulder 43 on the latch block, which acts like a pawl and prevents later descent of the slide. At the same time the roll 57 strikes the control arm 49, opening the switch and thereby shutting off the valve 54. The carriage 18 carrying the tire is by this action carried back out of contact with the large wheel 14, preventing further injury to the tire as the wheel continues to rotate. The hand wheel 28 is used merely to adjust the position of the carriage for different sizes of tires.

The above mechanism is also utilized in getting an accurate record of the length of run made by the tire before failure. A pair of gears 59, one for each carriage, is mounted on shaft 13, each gear meshing with a pinion 60 (Figs. 8 and 9) carried upon an arm 61 pivoted at 62 to the frame 11. A spring 63, strained between the arm and a bracket 64, keeps the arm normally against an adjustable stop 65 so that the pinion and gear mesh properly. A flexible shaft 66 connects the pinion to an ordinary combined speedometer and odometer 67 so that both the speed of rotation of the tire and the distance it has traveled can be registered. A cable 68, passing over guide rolls 69, connects the arm 61 with the short arm of bell crank 32, causing the pinion to be drawn out of mesh with the gear when the carriage is retracted.

The large wheel 14 may be provided with straight and annular blocks 70 and 71 to cause sudden deflection strains in the tires under test, and may be rotated by any suitable means. I have shown a pulley 72 connected by a belt 73 with a motor 74, which may be operated at variable speeds. Changes in mechanical design may, of course, be made as desired without departing from the scope of the invention as defined in the appended claim.

Having thus described my invention, I claim:

A tire testing machine which comprises a rotatable wheel, a tire support mounted for movement toward and from the wheel, weight means connected to said support to advance the support toward the wheel, a fluid pressure cylinder operably connected to the weight, means to raise the weight and retract the support, a valve for admitting fluid under pressure to the cylinder, an electric circuit including a solenoid and a switch for operating said valve, said switch being positioned to be actuated by the weight, means upon excessive advance of the tire support toward the wheel to close said circuit and thereby open said valve to raise the weight and retract the support and means to retain the weight in raised position when the support is retracted.

HAROLD E. WARNER.